US008819252B1

(12) United States Patent
Szeto et al.

(10) Patent No.: US 8,819,252 B1
(45) Date of Patent: Aug. 26, 2014

(54) TRANSACTION RATE LIMITING

(75) Inventors: Ronald W. Szeto, Pleasanton, CA (US);
David Chun Ying Cheung, San Jose, CA (US); Rajkumar Jalan, Saratoga, CA (US); Sridhar J. Devarapalli, Sunnyvale, CA (US)

(73) Assignee: Foundry Networks, LLC, San Jose, CA (US)

( * ) Notice: Subject to any disclaimer, the term of this patent is extended or adjusted under 35 U.S.C. 154(b) by 3369 days.

(21) Appl. No.: 10/139,095

(22) Filed: May 3, 2002

(51) Int. Cl.
*G06F 15/16* (2006.01)

(52) U.S. Cl.
USPC .......... 709/229; 709/203; 709/219; 709/227; 709/235; 726/3; 726/11; 718/105

(58) Field of Classification Search
USPC .......... 713/1, 2, 188, 194; 380/200, 201, 255, 380/277; 726/2, 3, 11; 709/203, 219, 227, 709/229, 235; 718/105
See application file for complete search history.

(56) References Cited

U.S. PATENT DOCUMENTS

| | | | | |
|---|---|---|---|---|
| 4,926,480 | A | * | 5/1990 | Chaum ............................ 705/69 |
| 5,761,507 | A | | 6/1998 | Govett |
| 5,774,660 | A | | 6/1998 | Brendel et al. |
| 5,956,489 | A | | 9/1999 | San Andres et al. |
| 6,044,260 | A | * | 3/2000 | Eaton et al. .................... 455/406 |
| 6,075,772 | A | | 6/2000 | Brown et al. |
| 6,088,452 | A | * | 7/2000 | Johnson et al. .................. 380/28 |
| 6,195,680 | B1 | | 2/2001 | Goldszmidt et al. |
| 6,314,465 | B1 | | 11/2001 | Paul et al. |
| 6,336,133 | B1 | * | 1/2002 | Morris et al. ................... 709/204 |
| 6,381,642 | B1 | | 4/2002 | O'Donnell et al. |
| 6,389,448 | B1 | | 5/2002 | Primak et al. |
| 6,438,652 | B1 | | 8/2002 | Jordan et al. |
| 6,457,061 | B1 | | 9/2002 | Bal et al. |
| 6,526,448 | B1 | | 2/2003 | Blewett |
| 6,587,881 | B1 | | 7/2003 | Agarwal et al. |
| 6,597,661 | B1 | | 7/2003 | Bonn |
| 6,701,415 | B1 | | 3/2004 | Hendren, III |
| 6,763,372 | B1 | | 7/2004 | Dani et al. |
| 6,851,062 | B2 | | 2/2005 | Hartmann et al. |
| 6,857,025 | B1 | | 2/2005 | Maruyama et al. |
| 6,883,033 | B2 | * | 4/2005 | Maruyama et al. ........... 709/229 |
| 7,007,092 | B2 | | 2/2006 | Peiffer |
| 7,107,609 | B2 | | 9/2006 | Cheng et al. |
| 7,131,140 | B1 | | 10/2006 | O'Rourke et al. |
| 2001/0039585 | A1 | | 11/2001 | Primak et al. |
| 2001/0042200 | A1 | | 11/2001 | Lamberton et al. |
| 2001/0047415 | A1 | | 11/2001 | Skene et al. |

(Continued)

OTHER PUBLICATIONS

Office Action, U.S. Appl. No. 10/139,076, dated Mar. 23, 2006.

(Continued)

*Primary Examiner* — Saleh Najjar
*Assistant Examiner* — Peiliang Pan
(74) *Attorney, Agent, or Firm* — Fountainhead Law Group, P.C.

(57) ABSTRACT

Transaction rate limiting is provided to monitor new connections. If the number of new connections requested by a particular client exceeds a predetermined threshold value, then the client may be frozen out for a configured period of time. By denying access for the configured period of time, the client is prevented from monopolizing a particular client. Additionally, if the client does have malicious intent, a denial of service attack may be thwarted. The denial of service may be accomplished without alerting the client. This prevents a malicious client from regrouping and attempting an assault via a different mechanism.

49 Claims, 4 Drawing Sheets

(56) References Cited

U.S. PATENT DOCUMENTS

| | | |
|---|---|---|
| 2002/0040400 A1 | 4/2002 | Masters |
| 2002/0099831 A1 | 7/2002 | Tsunogai |
| 2003/0041146 A1* | 2/2003 | Davis et al. .................. 709/227 |
| 2004/0024861 A1 | 2/2004 | Coughlin |
| 2004/0162901 A1 | 8/2004 | Mangipudi et al. |

OTHER PUBLICATIONS

Office Action, U.S. Appl. No. 10/139,073, dated Mar. 31, 2006.
U.S. Appl. No. 10/139,073, filed May 3, 2002 (Co-pending and commonly assigned).
Office action in U.S. Appl. No. 10/139,073, mailed Jan. 29, 2007.
U.S. Appl. No. 10/139,076, filed May 3, 2002 (Co-pending and commonly assigned).
Office action in U.S. Appl. No. 10/139,076, mailed Mar. 12, 2007.
Office Action dated Sep. 20, 2005, U.S. Appl. No. 10/139,073.
Office Action dated Aug. 16, 2007, U.S. Appl. No. 10/139,073.
Office Action dated Jan. 10, 2008, U.S. Appl. No. 10/139,073.
Office Action dated Sep. 12, 2008, U.S. Appl. No. 10/139,073.
Office Action dated Apr. 27, 2009, U.S. Appl. No. 10/139,073.
Office Action dated Jan. 5, 2010, U.S. Appl. No. 10/139,073.
Office Action dated Sep. 11, 2007, U.S. Appl. No. 10/139,076.
Office Action dated Feb. 21, 2008, U.S. Appl. No. 10/139,076.
Office Action dated Mar. 31, 2009, U.S. Appl. No. 10/139,076.
Office Action dated Sep. 9, 2009, U.S. Appl. No. 10/139,076.
Office Action dated Jul. 13, 2005, U.S. Appl. No. 10/139,076.
Office Action dated Jul. 25, 2006, U.S. Appl. No. 10/139,076.
Notice of Allowance dated Mar. 8, 2010, U.S. Appl. No. 10/139,073.
Notice of Allowance dated Apr. 28, 2010, U.S. Appl. No. 10/139,076.
U.S. Appl. No. 12/785,423, filed May 21, 2010.

\* cited by examiner

TRANSACTION RATE LIMITING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to the field of web switches. More particularly, the present invention relates to transaction rate limiting to protect ports on a web switch.

BACKGROUND OF THE INVENTION

Web switches provide traffic management to computer networks. The traffic management extends to packets received both from an outside network, such as the Internet, and from an internal network. Web switches, however, are susceptible to denial of service attacks. In a denial of service attack, a network is assaulted with a flood of requests such that regular traffic is either slowed or completely interrupted. One common type of denial of service attack is SYN flooding. In a SYN flood attack, the final acknowledgement in the server's SYN-ACK response in the handshaking process is withheld. This causes the server to keep signaling until it eventually times out. What is needed is a solution which protects a web server from SYN flood attacks.

Additionally, even if a web switch isn't under attack, there may be situations where an individual source IP address is taking more than an appropriate share of the network resources. Even though the client may not have malicious intent, it can still result in a disruption in service. Therefore, what is also needed is a solution which prevents a source IP address from taking more than an appropriate share of system resources.

BRIEF DESCRIPTION OF THE INVENTION

Transaction rate limiting is provided to monitor new connections. If the number of new connections requested by a particular client exceeds a predetermined threshold value calculated for a specific period of time, then the client may be frozen out for a configured period of time. By denying access for the configured period of time, the client is prevented from monopolizing a particular service. Additionally, if the client does have malicious intent, a denial of service attack will be thwarted. The denial of service may be accomplished without alerting the client. This may prevent a malicious client from attempting an assault via a different mechanism.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
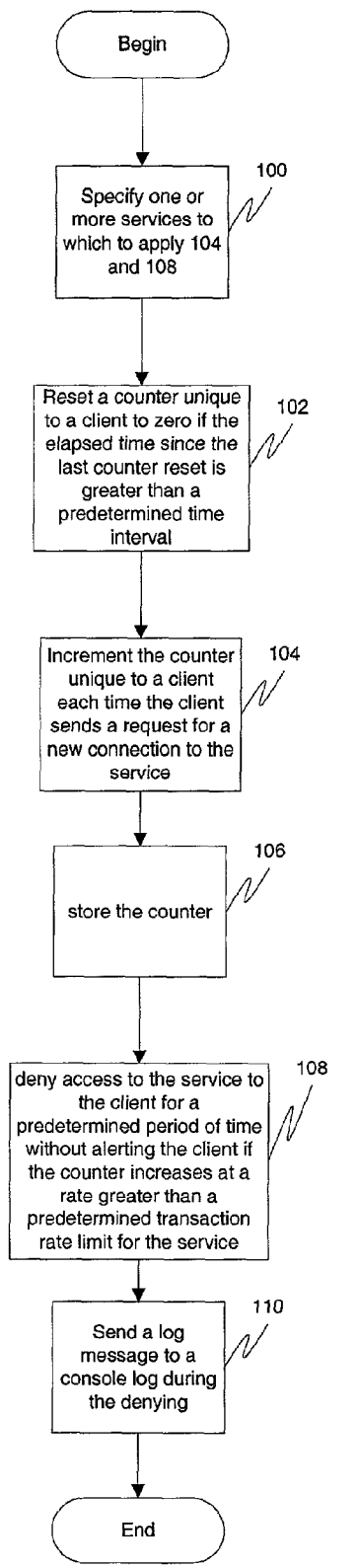
FIG. 1 is a flow diagram illustrating a method for protecting a service in a computer network in accordance with a specific embodiment of the present invention.

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In accordance with a specific embodiment of the present invention, transaction rate limiting is provided to monitor new connections. If the number of new connections requested by a particular client exceeds a predetermined threshold value calculated for a specific period of time, then the client may be frozen out for a configured period of time. By denying access for the configured period of time, the client is prevented from monopolizing a particular service. Additionally, if the client does have malicious intent, a denial of service attack is thwarted.

In accordance with a specific embodiment of the present invention, no message is sent to the client indicating that access has been suspended. This may prevent a malicious client from attempting an assault via a different mechanism. In accordance with a specific embodiment of the present invention, the transaction rate limiting is applied on a per interface (port) or per service level. This allows any component to be protected from SYN flood attacks. In a specific embodiment of the present invention, the interface can be a physical port, virtual interface (1 to n ports) or trunk.

FIG. 1 is a flow diagram illustrating a method for protecting a service in a computer network in accordance with a specific embodiment of the present invention. At 100, one or more services are specified to which to apply 104 and 108. At 102, a counter unique to a client is reset to zero if the elapsed time since the last counter reset is greater than a predetermined time interval. At 104, a counter unique to a client is incremented each time the client sends a request for a new connection to the service. At 106, the counter is stored. It may be stored on a component of the network to which the software is installed, such as a cache, cache farm, firewall, firewall farm, server or server farm. At 108, access to the service is denied to the client for a predetermined period of time without alerting the client if the counter increases at a rate greater than a predetermined transaction rate limit for the service. The transaction rate limit may be a number of transactions per predetermined time interval. At 110, a log message may be sent to a console log during the denial of service.

Figure 2:
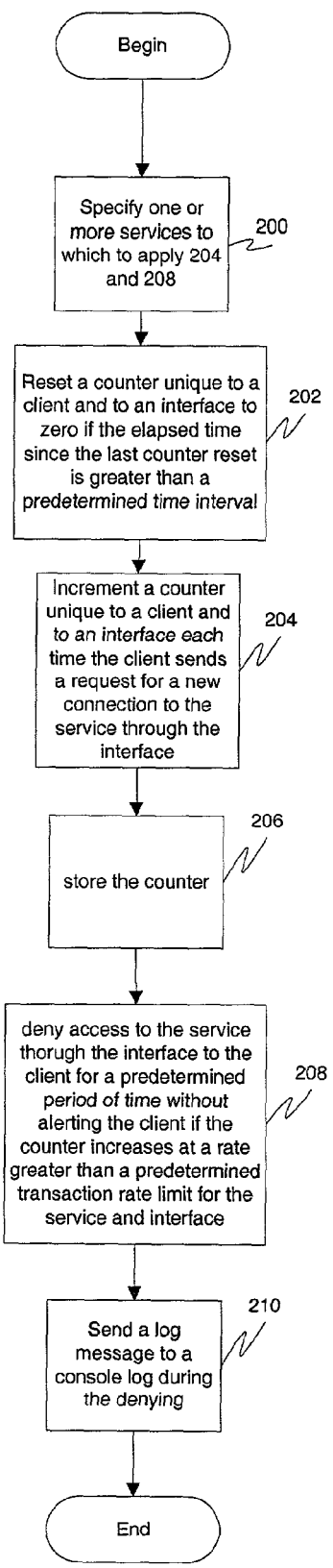
FIG. 2 is a flow diagram illustrating a method for protecting a service in a computer network in accordance with another embodiment of the present invention.

FIG. 2 is a flow diagram illustrating a method for protecting a service in a computer network in accordance with another embodiment of the present invention. At 200, one or more services are specified to which to apply 204 and 208. At 202, a counter unique to a client and to an interface is reset to zero if the elapsed time since the last counter reset is greater than a predetermined time interval. At 204, a counter unique to a client and to an interface is incremented each time the client sends a request for a new connection to the service through the interface. The interface may be configured to deflect a TCP denial of service. One example of this is a SYN proxy, thus permitting the specific targeting of SYN flood attacks. At 206, the counter is stored. It may be stored on a component of the network to which the software is installed, such as a cache, cache farm, firewall, firewall farm, server or server farm. At 208, access to the service through the interface is denied to the client for a predetermined period of time without alerting the client if the counter increases at a rate greater than a predetermined transaction rate limit for the service and interface. The transaction rate limit may be a number of transactions per predetermined time interval. At 210, a log message is sent to a console log during the denying.

Figure 3:
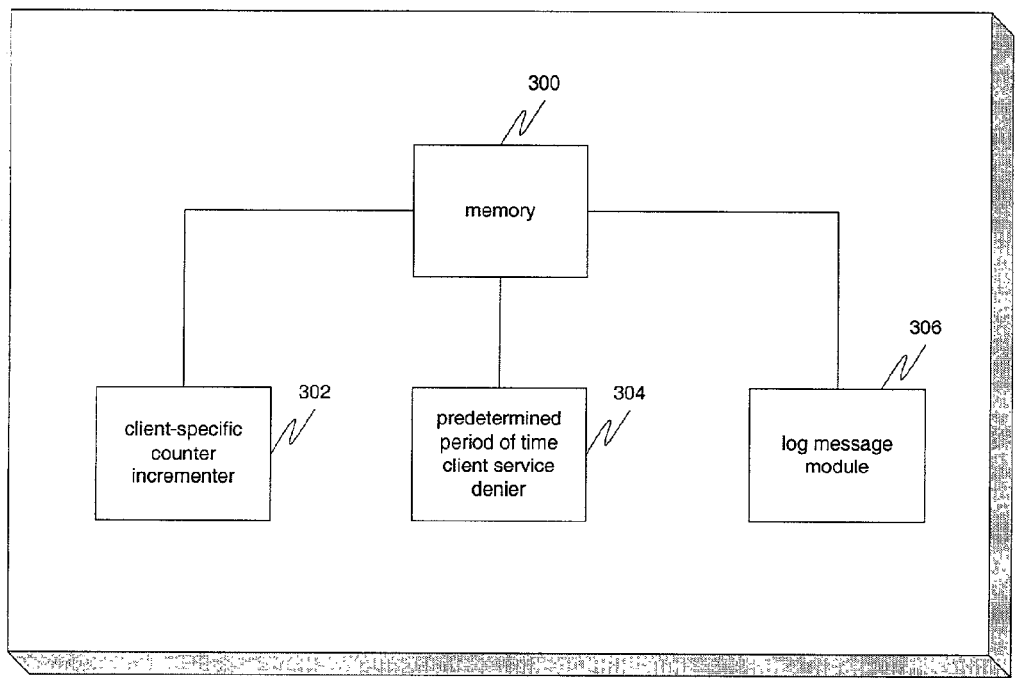
FIG. 3 is a block diagram illustrating an apparatus for protecting a service in a computer network in accordance with a specific embodiment of the present invention.

FIG. 3 is a block diagram illustrating an apparatus for protecting a service in a computer network in accordance with a specific embodiment of the present invention. A memory 300 may be used to store a counter and a predetermined transaction rate limit. A client-specific counter incrementer 302 coupled to the memory 300 increments a counter unique to a client each time the client sends a request for a new connection to the service. A predetermined period of time client service denier 304 coupled to the client-specific counter incrementer 302 and to the memory 300 denies access to the service for the client for a predetermined period of time without alerting the client if the counter increases at a rate greater than a predetermined transaction rate limit for the service. A log message module 306 coupled to the predetermined period of time client service denier 304 then sends a log message to a console log during the denying.

Figure 4:
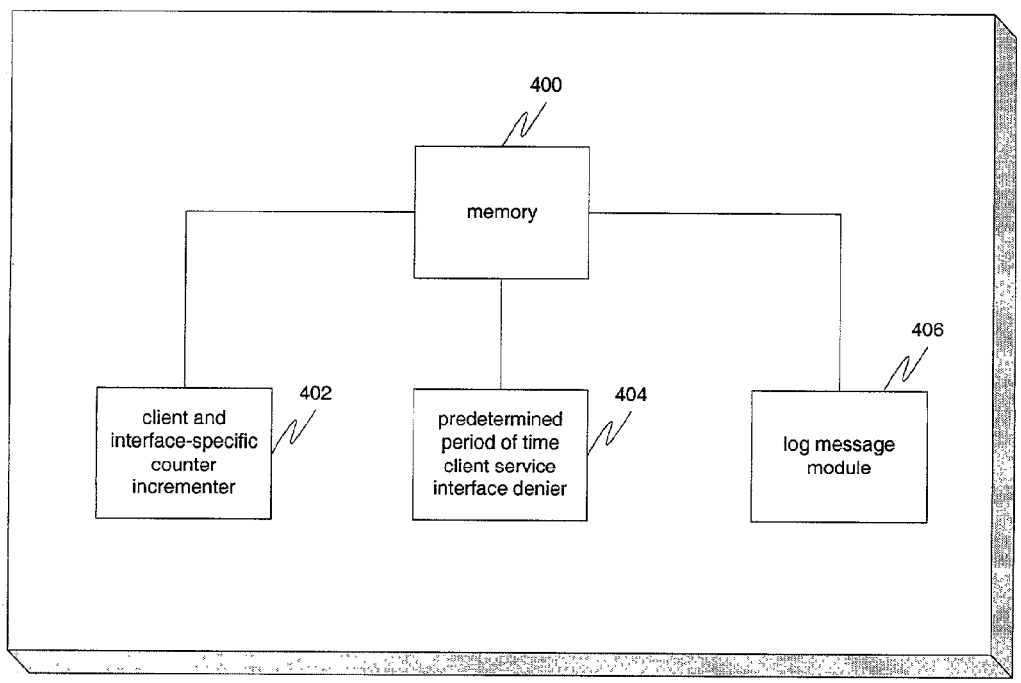
FIG. 4 is a block diagram illustrating an apparatus for protecting a service in a computer network in accordance with a specific embodiment of the present invention.

FIG. 4 is a block diagram illustrating an apparatus for protecting a service in a computer network in accordance with a specific embodiment of the present invention. A memory 400 may be used to store a counter and a predetermined transaction rate limit. A client and interface-specific counter incrementer 402 coupled to the memory 400 increments a counter unique to a client and an interface each time the client sends a request for a new connection to the service through the interface. The interface may be a SYN proxy, thus specifically targeting SYN flood attacks. A predetermined period of time client service interface denier 404 coupled to the client and interface-specific counter incrementer 402 and to the memory 400 denies access to the service through the interface for the client for a predetermined period of time without alerting the client if the counter increases at a rate greater than a predetermined transaction rate limit for the service and interface. A log message module 406 coupled to the predetermined period of time client service interface denier 404 then sends a log message to a console log during the denying.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method comprising:
    determining, by a network switch, one or more of a plurality of services to be transaction rate limited;
    incrementing, by the network switch, a number unique to a client each time the client sends a request for a new connection to a particular one of the plurality of services; and
    denying, by the network switch, access by the client to the particular one of the plurality of services for a predetermined period of time without alerting the client if the number increases at a rate greater than a predetermined transaction rate limit for the particular one of the plurality of services.

2. The method of claim 1, further including resetting, by the network switch, the number to zero if the elapsed time since a last number reset is greater than a predetermined time interval.

3. The method of claim 2, wherein the predetermined transaction rate limit is a number of transactions per predetermined time interval.

4. The method of claim 1, further including storing, by the network switch, the number in a record for a cache.

5. The method of claim 1, further including storing, by the network switch, the number in a record for a cache farm.

6. The method of claim 1, further including storing, by the network switch, the number in a record for a firewall.

7. The method of claim 1, further including storing, by the network switch, the number in a record for a firewall farm.

8. The method of claim 1, further including storing, by the network switch, the number in a record for a server.

9. The method of claim 1, further including storing, by the network switch, the number in a record for a server farm.

10. The method of claim 1, further including sending, by the network switch, a log message to a console log during the denying.

11. A computer implemented method comprising:
    determining, by a network switch, one or more of a plurality of services to be transaction rate limited;
    incrementing, by the network switch, a number unique to a client and an interface each time the client sends a request for a new connection to a particular one of the plurality of services through the interface; and
    denying, by the network switch, access by the client to the particular one of the plurality of services through the interface for a predetermined period of time without alerting the client if the number increases at a rate greater than a predetermined transaction rate limit for the particular one of the plurality of services and the interface.

12. The method of claim 11, further including resetting, by the network switch, the number to zero if the elapsed time since a last number reset is greater than a predetermined time interval.

13. The method of claim 12, wherein the predetermined transaction rate limit is a number of transactions per predetermined time interval.

14. The method of claim 11, further including storing, by the network switch, the number in a record for a cache.

15. The method of claim 11, further including storing, by the network switch, the number in a record for a cache farm.

16. The method of claim 11, further including storing, by the network switch, the number in a record for a firewall.

17. The method of claim 11, further including storing, by the network switch, the number in a record for a firewall farm.

18. The method of claim 11, further including storing, by the network switch, the number in a record for a server.

19. The method of claim 11, further including storing, by the network switch, the number in a record for a server farm.

20. The method of claim 11, further including sending, by the network switch, a log message to a console log during the denying.

21. The method of claim 11, wherein the interface is a SYN proxy.

22. An apparatus comprising:
a memory;
a client-specific counter incrementer coupled to the memory and configured to increment a number unique to a client each time the client sends a request for a new connection to one or more of a plurality of services to be transaction rate limited; and
a predetermined period of time client service denier coupled to the client-specific counter incrementer and to the memory, the predetermined period of time client service denier configured to deny access by a client to a particular one of the plurality of services for a predetermined period of time without alerting the client if the number increases at a rate greater than a predetermined transaction rate limit for the particular one of the plurality of services.

23. The apparatus of claim 22, further including a log message module coupled to the predetermined period of time client service denier and configured to send a log message to a console log during the denying.

24. An apparatus comprising:
a memory;
a client and interface-specific counter incrementer coupled to the memory and configured to increment a number unique to a client and an interface each time the client sends a request for a new connection to a particular one of the plurality of services through the interface; and
a predetermined period of time client service interface denier coupled to the client and interface-specific counter incrementer and to the memory, the predetermined period of time client service denier configured to deny access by the client to the particular one of the plurality of for a predetermined period of time without alerting the client if the number increases at a rate greater than a predetermined transaction rate limit for the particular one of the plurality of services.

25. The apparatus of claim 24, further including a log message module coupled to the predetermined period of time client service interface denier and configured to send a log message to a console log during the denying.

26. An apparatus comprising:
means for determining, by a network switch, one or more of a plurality of services to be transaction rate limited;
means for incrementing, by the network switch, a number unique to a client each time the client sends a request for a new connection to a particular one of the plurality of services; and
means for denying, by the network switch, access by the client to the particular one of the plurality of services for a predetermined period of time without alerting the client if the number increases at a rate greater than a predetermined transaction rate limit for the particular one of the plurality of services.

27. The apparatus of claim 26, further including means for resetting, by the network switch, the number if the elapsed time since the last counter reset is greater than a predetermined time interval.

28. The apparatus of claim 27, wherein the predetermined transaction rate limit is a number of transactions per predetermined time interval.

29. The apparatus of claim 26, further means for storing, by the network switch, the number in a record for a cache.

30. The apparatus of claim 26, further including means for storing, by the network switch, the number in a record for a cache farm.

31. The apparatus of claim 26, further including means for storing, by the network switch, the number in a record for a firewall.

32. The apparatus of claim 26, further including means for storing, by the network switch, the number in a record for a firewall farm.

33. The apparatus of claim 26, further including means for storing, by the network switch, the number in a record for a server.

34. The apparatus of claim 26, further including means for storing, by the network switch, the number in a record for a server farm.

35. The apparatus of claim 26, further including means for sending, by the network switch, a log message to a console log during the denying.

36. An apparatus comprising:
means for determining, by a network switch, one or more services to be transaction rate limited;
means for incrementing, by the network switch, a number unique to a client and an interface each time the client sends a request for a new connection to the one or more services through the interface; and
means for denying, by the network switch, access by the client to the one or more services through the interface for a predetermined period of time without alerting the client if the number increases at a rate greater than a predetermined transaction rate limit for the one or more services and the interface.

37. The apparatus of claim 36, further including means for resetting, by the network switch, the number to zero if the elapsed time since the last counter reset is greater than a predetermined time interval.

38. The apparatus of claim 37, wherein the predetermined transaction rate limit is a number of transactions per predetermined time interval.

39. The apparatus of claim 36, further including means for specifying, by the network switch, one or more services to which to apply the incrementing and the denying.

40. The apparatus of claim 36, further including means for storing, by the network switch, the number in a record for a cache.

41. The apparatus of claim 36, further including means for storing, by the network switch, the number in a record for a cache farm.

42. The apparatus of claim 36, further including means for storing, by the network switch, the number in a record for a firewall.

43. The apparatus of claim 36, further including means for storing, by the network switch, the number in a record for a firewall farm.

44. The apparatus of claim 36, further including means for storing, by the network switch, the number in a record for a server.

45. The apparatus of claim 36, further including means for storing, by the network switch, the number in a record for a server farm.

46. The apparatus of claim 36, further including means for sending, by the network switch, a log message to a console log during the denying.

47. The apparatus of claim 36, wherein the interface is a SYN proxy.

48. A program storage device readable by a machine, tangibly embodying a program of instructions executable by the machine to perform a method, the method comprising:
  determining, by a network switch, one or more of a plurality of services to be transaction rate limited;
  incrementing, by the network switch, a number unique to a client each time the client sends a request for a new connection to a particular one of the plurality of services; and
  denying, by the network switch, access by the client to the particular one of the plurality of services for a predetermined period of time without alerting the client if the number increases at a rate greater than a predetermined transaction rate limit for the particular one of the plurality of services.

49. A program storage device readable by a machine, tangibly embodying a program of instructions executable by the machine to perform a method, the method comprising:
  determining, by a network switch, one or more of a plurality of services to be transaction rate limited;
  incrementing, by the network switch, a number unique to a client and an interface each time the client sends a request for a new connection to a particular one of the plurality of services through the interface; and
  denying, by the network switch, access by the client to the particular one of the plurality of services through the interface for a predetermined period of time without alerting the client if the number increases at a rate greater than a predetermined transaction rate limit for the particular one of the plurality of services and the interface.

\* \* \* \* \*